United States Patent
Kieslich et al.

(10) Patent No.: US 10,889,909 B2
(45) Date of Patent: Jan. 12, 2021

(54) GALVANICALLY DECORATED COMPONENT AND METHOD FOR PRODUCING A GALVANICALLY DECORATED COMPONENT

(71) Applicant: Gerhardi Kunststofftechnik GmbH, Luedenscheid (DE)

(72) Inventors: Dirk Kieslich, Plettenberg (DE); Binfeng Hu, Luedenscheid (DE)

(73) Assignee: Gerhardi Kunststofftechnik GmbH, Luedenscheid (DE)

( * ) Notice: Subject to any disclaimer, the term of this patent is extended or adjusted under 35 U.S.C. 154(b) by 296 days.

(21) Appl. No.: 15/754,705

(22) PCT Filed: Sep. 1, 2016

(86) PCT No.: PCT/EP2016/070578
§ 371 (c)(1),
(2) Date: Feb. 23, 2018

(87) PCT Pub. No.: WO2017/037153
PCT Pub. Date: Mar. 9, 2017

(65) Prior Publication Data
US 2018/0251905 A1 Sep. 6, 2018

(30) Foreign Application Priority Data
Sep. 3, 2015 (DE) .................... 20 2015 006 095 U

(51) Int. Cl.
C25D 5/02 (2006.01)
C25D 5/56 (2006.01)

(52) U.S. Cl.
CPC ............... *C25D 5/56* (2013.01); *C25D 5/022* (2013.01)

(58) Field of Classification Search
None
See application file for complete search history.

(56) References Cited

U.S. PATENT DOCUMENTS

| 6,638,669 B2 | 10/2003 | Schneider et al. |
| 6,899,814 B2 | 5/2005 | Schneider et al. |
| 2002/0092825 A1* | 7/2002 | Schneider ............. B41C 1/1091 216/49 |

(Continued)

FOREIGN PATENT DOCUMENTS

| AU | 676356 B2 | 3/1997 |
| DE | 43 30 961 C1 | 7/1994 |

(Continued)

OTHER PUBLICATIONS

International Search Report of PCT/EP2016/070578, dated Dec. 5, 2016.

*Primary Examiner* — Stefanie S Wittenberg
(74) *Attorney, Agent, or Firm* — Collard & Roe, P.C.

(57) ABSTRACT

A method for producing a galvanically decorated component with a symbol or structure of a transilluminatable design incorporated in the surface produces the component from an electroplatable plastic in an injection-molding process, and the symbol or structure is produced from a non-electroplatable, electroplating-resistant printed image. The printed image is transferred from a carrier onto the component using thermal transfer by being activated using a laser. A galvanically decorated component is produced by the method.

1 Claim, 1 Drawing Sheet

(56) References Cited

U.S. PATENT DOCUMENTS

2016/0312366 A1   10/2016   Kieslich

FOREIGN PATENT DOCUMENTS

Figure 1:
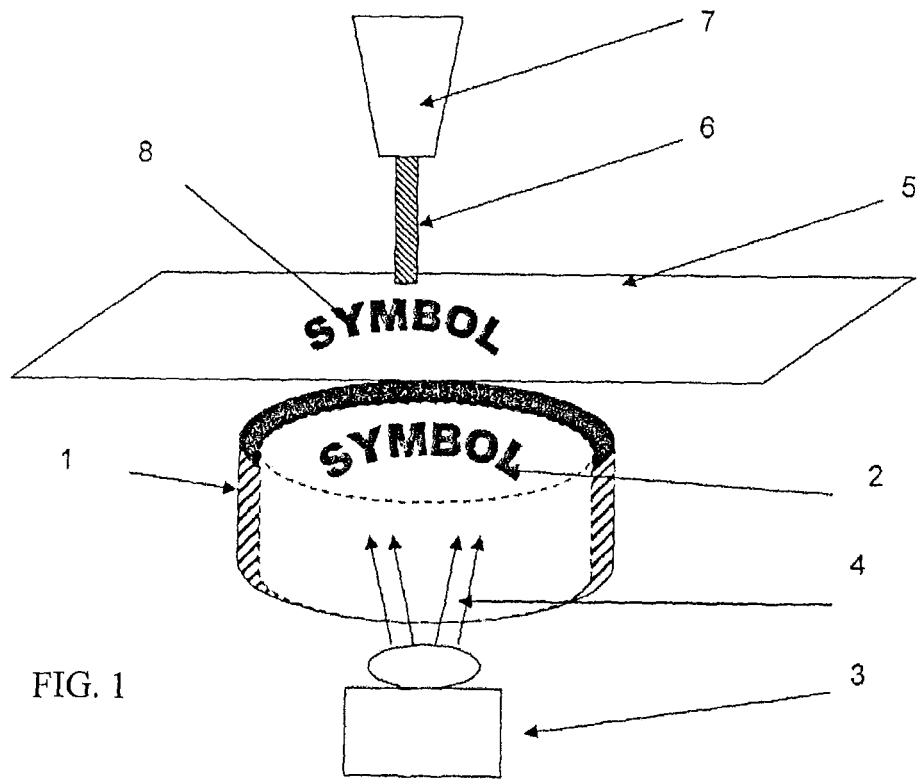

| DE | 10 2006 042 269 A1 | 3/2008 |
|----|---------------------|--------|
| DE | 10 2011 104 018 A1 | 4/2012 |
| DE | 20 2013 009 793 U1 | 2/2014 |
| EP | 1 188 560 A2 | 3/2002 |
| EP | 1 219 417 A2 | 7/2002 |

* cited by examiner

GALVANICALLY DECORATED COMPONENT AND METHOD FOR PRODUCING A GALVANICALLY DECORATED COMPONENT

CROSS REFERENCE TO RELATED APPLICATIONS

This application is the National Stage of PCT/EP2016/070578 filed on Sep. 1, 2016, which claims priority under 35 U.S.C. § 119 of German Application No. 20 2015 006 095.1 filed on Sep. 3, 2015, the disclosure of which is incorporated by reference. The international application under PCT article 21(2) was not published in English.

The invention relates to a method for the production of a component decorated by electroplating, having a symbol or structure introduced into the surface, through which light can pass, in which method the component is produced from a plastic that can be electroplated, using the injection-molding method, and the symbol or structure is produced from a printed image that cannot be electroplated and is stable with regard to electroplating. The invention furthermore relates to a component decorated by electroplating.

In the case of components composed of plastic for the automotive industry, of the type being considered here, these are essentially operating elements with which various functions of the automobile can be operated. These include, for example, start/stop buttons, operating elements for vehicle lighting or climate control. The said components have in common that they have a symbol or words or the like, which describe the respective function. This symbol is configured to have a different color from the rest of the operating element. Demands on the symbol are, for example, good contrast in comparison with the operating element itself and the ability to be backlit.

Various methods are known for the production of the aforementioned components composed of plastic. Thus, for example, the PVD method (physical vapor deposition) is based on the metallization of an operating element produced from a plastic. In this regard, thin layers are deposited in a vacuum. The material to be deposited is present in solid form. The evaporated material moves through the vacuum chamber and impacts the components to be coated, where layer formation takes place. The desired symbol is burned in by means of a laser process and the PVD coating is partially removed.

It is true that the PVD method is suitable for applying the desired symbol to the components. However, it has proven to be problematical that the symbol produced from metal does not demonstrate sufficient strength against wear and corrosion without an additional protective layer. For this reason, it is necessary to apply a protective layer, for example composed of varnish. However, the costs are significantly increased by this additional work step.

Furthermore, methods are known in which the components are coated by being electroplated. In this regard, the parts are first produced using the injection-molding method, for example from copolymerizates that contain butadiene, such as ABS or ABS/PC. After the injection-molding procedure, the components are pretreated by being electroplated, in order to produce a thin metal layer, generally a thin nickel layer. The components are then removed from the electroplating process. After removal, the electroplated metal layer is removed in certain regions, by means of a laser. The components treated in this manner are then passed to the electroplating process once again and deposition is continued until the desired chrome layer has been formed. The lasered regions then form the symbol.

It is true that it is possible, using the said methods, to produce technically and optically high-quality operating elements. However, the method has the disadvantage that for one thing, the additional work step of laser use for production of the symbol increases the costs. For another thing, in the aforementioned method, two electroplating processes are required. Furthermore, the symbols are exposed down to the plastic material of the unfinished part, and this can lead to problems in the event of subsequent contact with cosmetics, in particular sun creams, since the plastic materials used are not or only conditionally resistant. In total, the method is not well suited for mass-production components because of the method sequences that exist.

This is where the invention wishes to provide a remedy. The invention is based on the task of creating a method for the production of a component decorated by electroplating, having a symbol introduced into the surface using laser-activated thermal transfer imprinting, preferably a symbol or structure through which light can pass, in which method the component is produced from a plastic that can be electroplated, using the injection-molding method, which component is, on the one hand, cost-advantageous and also suitable for the production of mass-produced products, but on the other hand also makes the required wear resistance of the respective operating elements available even without additional treatment.

According to the invention, this task is accomplished in that the printed image is transferred from a carrier to the component by means of activation by a laser, by means of thermal transfer. The term thermal transfer method subsumes methods in which the desired printed image is produced by means of partial heat generation, without any greater mechanical influence on the printed material. The resulting printed image is very durable and can be used on the most varied materials. In contrast to conventional thermal transfer methods for the production of components produced from plastic for the automotive industry, by means of hot stamping, in which the transfer of the varnish system from the carrier to the component is applied by means of a heated punch, the transfer of the varnish system takes place by means of heat introduction using a laser, according to the invention.

This application form has the advantage that for one thing, very fine contours can be produced, which cannot be produced with hot stamping using a silicon punch or metal punch. A further advantage of the method described according to the invention is increased flexibility, since imprecisions in the printed image that occur in the known method by means of hot stamping often have to be corrected by new production of multiple new punches, under some circumstances, while in the technique according to the invention, only the programming of the laser needs to be modified to optimize the printed image. Furthermore, in the method according to the invention, the transfer of the varnish system from the carrier to the component takes place essentially without contact, and in this way, the mechanical influences on the components to be imprinted, which are known from other thermal transfer methods, are avoided.

With the invention, a method for the production of a symbol or structure introduced into a surface deposited by electroplating, in components composed of plastic, for the automotive industry, by means of electroplating, is created, which method, in comparison with methods known from the state of the art, is advantageous and significantly more cost-advantageous. This is brought about in that only one electroplating process is necessary. Furthermore, interruption of the electroplating process for laser treatment of the components, as known from the state of the art, is not required, so that the electroplating can be undertaken in a single, continuous procedure. In addition, high-quality components, which also meet the requirements, for example against friction wear and resistance to media, such as cosmetics, can be produced with the method according to the invention.

In a further development of the invention, the symbol is applied using varnish that cannot be electroplated. The use of varnishes has the advantage, on the one hand that the most varied varnishes having different properties and colors are available for processing, and, on the other hand, that any desired shapes for symbols, words or numbers can be depicted using the varnishes.

Preferably, the symbol is imprinted onto the component by means of a laser-activated thermal transfer method. This technique represents a simple method, particularly when using varnishes that cannot be electroplated for the production of the symbol, and furthermore, it can be well integrated into the remainder of the process sequence.

In another further development of the invention, the printed images to be transferred are also processed with a combusting laser beam, following the contour. It is true that the printed images to be transferred serve all optical demands, as experience has shown; however, they can still be processed with a combusting laser beam, following the contour, in order to rework the contours of the symbols and structures, and in order to remove irregularities at the outer edges of the electroplated components.

Figure 2:
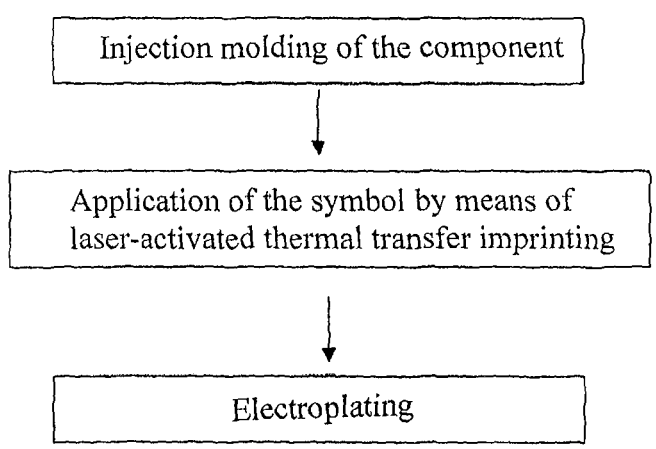

Other further developments and embodiments of the invention are indicated in the remaining dependent claims. An exemplary embodiment of the invention is shown in the drawings and will be described in detail below. The figures show:

FIG. 1 the schematic representation of an electroplated component composed of plastic, in the form of a start/stop button and FIG. 2 the flow chart of the method according to the invention.

The coated component 1, shown as an exemplary embodiment, shows a product produced from plastic for the automotive industry, with subsequent electroplating. The component 1, after completion of the method, has a symbol 2, which can be both pictograms and numbers, words or the like.

In the exemplary embodiment according to FIG. 1, a start/stop button for an automobile is described, with which the engine of the automobile can be started and shut off again. In this case, the symbol consists of the words "start," "stop," and "engine." If other operating elements are involved, the symbol is generally formed in the form of a pictogram, for example the representation of a headlight, if an operating element for vehicle lighting is involved.

In the method according to the exemplary embodiment according to FIG. 2, first the component to be produced from plastic is produced using the injection-molding method. The plastic is preferably a plastic that can be electroplated, preferably ABS or ABS/PC. A printed image according to the subsequent symbol 2 is then applied to the component 1. In this regard, the symbol 2 is formed by a material that cannot be electroplated. Preferably, the symbol 2 is applied using a varnish that cannot be electroplated. Application of the symbol 2 to the component 1 takes place as described below:

The printed image is applied after the injection-molding process of the component 1. According to the invention, the printed image 8 is imprinted onto a carrier 5, which is preferably a film, using varnish that cannot be electroplated. From the carrier 5, the imprinted printed image 8 is transferred by means of temperature introduction by means of activation of a laser 7. The printed image 8 is transferred from the carrier 5 to the component 1 by means of the laser beam that is thereby generated, which is indicated with "6" in FIG. 1. In this regard, the symbol 2 can be structured on the carrier 5 in accordance with the printed image 8, so that the symbol 2 is depicted on the component 1 by means of area-wide temperature introduction.

Alternatively, the carrier 5 can be completely coated, so that the symbol 2 is produced on the component 1 by means of the laser 7 passing over the printed image 8.

After cooling of the component, the symbol 2 is raised on the component 1, since the layer that represents the symbol is deposited on the component 1 from the carrier 5 due to the introduction of heat, and adheres there. In this regard, the thickness of the applied layer of the symbol 2 on the component 1 amounts to between 1 μm and 15 μm.

As explained above, the transfer of the varnish that cannot be electroplated to the component takes place after the injection-molding process. Application of the varnish according to the method according to the invention takes less time, in this regard, than the time that is need for injection-molding of the component, for example. Consequently, the procedure can be integrated into the machine cycle without lengthening the cycle time. Coating of the components according to the method according to the invention can consequently be integrated into already existing production processes of components made of plastic, of the stated type, without changing the cycle times.

After application, the components, with the layer that cannot be electroplated and represents the subsequent symbol, are passed along to electroplating. Electroplating takes place in known manner, by means of chemical and electrochemical deposition of multiple metal layers, which is conventionally concluded with a decorative layer composed of chrome. These metal layers easily hold to the components composed of plastic that can be electroplated, particularly ABS or ABS/PC, as a composite. Only the regions provided with the printed image 8 are not coated with metal, because these are covered with a varnish that cannot be electroplated. Because of the different color of the substratum of the component 1, the symbol 2 can be seen. Furthermore, the possibility exists of also producing a backlit component in this manner, in that the rear side is kept free of metal or reworked in such a manner. As shown in FIG. 1, in this case light rays 4 can be emitted by a light source 3 affixed under or behind the component 1, which rays are then visible through the symbol 2, which is not electroplated, so that the contour of the symbol 2 can be seen even in the dark. The symbol 2 is therefore produced in translucent manner.

The invention claimed is:

1. A method for producing a decorated electroplated component having a surface with a light-transmissive symbol or structure, the method comprising:
  producing a component from a plastic that can be electroplated, using an injection-molding method; and
  thermally transferring from a carrier to the component using laser activation a symbol or structure comprising a printed image that cannot be electroplated and is stable with regard to electroplating;
  wherein transfer of the printed image is applied after the injection-molding procedure of the component; and wherein the carrier is completely coated so that the symbol or structure is produced on the component by the laser passing over the printed image and the component is subsequently electroplated.

* * * * *